Dec. 22, 1931.  A. L. VENCILL  1,837,738
APPARATUS FOR CHARGING STORAGE BATTERIES
Filed June 26, 1930
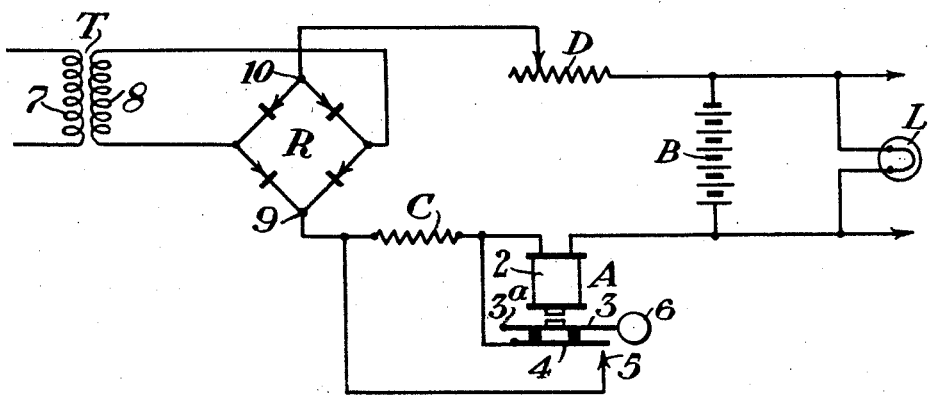
INVENTOR
Albert L. Vencill Patented Dec. 22, 1931

1,837,738

UNITED STATES PATENT OFFICE

ALBERT L. VENCILL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

APPARATUS FOR CHARGING STORAGE BATTERIES

Application filed June 26, 1930. Serial No. 463,904.

My invention relates to apparatus for charging storage batteries. One feature of my invention is the provision of means for increasing the rate of charge of a storage battery after a failure of the source of charging current. Another feature of my invention is the provision of means responsive to a failure of the charging current for leaving a telltale indication that such failure has occurred.

I will describe one form of apparatus embodying my invention, and will then point out the novel features thereof in claims.

The accompanying drawing is a diagrammatic view showing one form of apparatus embodying my invention.

Referring to the drawing, the reference character B designates a storage battery which supplies current to a load represented by an electric lamp L. This battery is constantly charged from a transformer T, the primary 7 of which is connected with a source of alternating current which is not shown in the drawing. The secondary 8 of transformer T is connected with the input terminals of a full-wave rectifier R. The output circuit of rectifier R is from the lower terminal 9 through a resistance C, the winding 2 of a relay A, battery B, and an adjustable resistance D, to the upper terminal 10 of the rectifier R. Current in this circuit is supplied to a load L, and is also supplied to the battery B to charge the battery.

The relay A comprises an armature 3 pivotally mounted at 3ª carrying a telltale disk 6. This armature is also provided with a contact member 4 which engages a fixed contact 5 when the armature is released. When contact 4—5 is closed, a low resistance shunt is closed around the resistance C. The relay A is so proportioned that the armature 3 is held closed by the normal current supplied by the rectifier R, but that when the armature releases, due to failure of current from the rectifier R, the armature will remain open after the charging current is restored, and must then be closed by hand. The telltale disk 6 may be so associated with an opening in the relay case that this disk is invisible when the armature is closed, but becomes visible when the armature is open.

The operation of the apparatus is as follows: Normally, relay A is energized by the current supplied by rectifier R, so that the resistance C is included in the charging circuit for battery B, with the result that a relatively small amount of current is supplied to the battery. In the event of failure of the charging current, however, relay A will become deenergized, thereby closing back contact 4—5, and when the charging current is restored, this contact will remain closed, so that resistance C will be shunted out of the charging circuit, and the charging current supplied to battery B will then be relatively large. This condition will continue until the armature 3 of relay A is manually closed, whereupon it will remain closed and the charging current supplied to battery B will be reduced.

If desired, the back contact 4—5 of relay A may be omitted. Then the telltale disk 6 will indicate when there has been a failure of the charging current and the rate of charge of the storage battery B may then be temporarily increased by manual operation of the adjustable resistance D.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a storage battery, a charging circuit for said battery including a source of direct current and a resistance as well as the winding of a relay all connected in series, and a shunt path around said resistance including a back contact of said relay, said relay being so proportioned that it is held closed by the normal charging current in said circuit but that when it releases due to failure of charging current it will remain open after the charging current is restored.

2. In combination, a storage battery, a charging circuit for said battery including a source of direct current and a resistance as well as the winding of a relay all connected in series, an indicator attached to the armature of said relay, and a shunt path around said resistance including a back contact of said relay, said relay being so proportioned that it is held closed by the normal charging current in said circuit but that when it releases due to failure of charging current it will remain open after the charging current is restored.

In testimony whereof I affix my signature.

ALBERT L. VENCILL.